INVENTORS
Jean-Pierre Biet
Jean Chaupit
By Paul M. Craig, Jr.
ATTORNEY

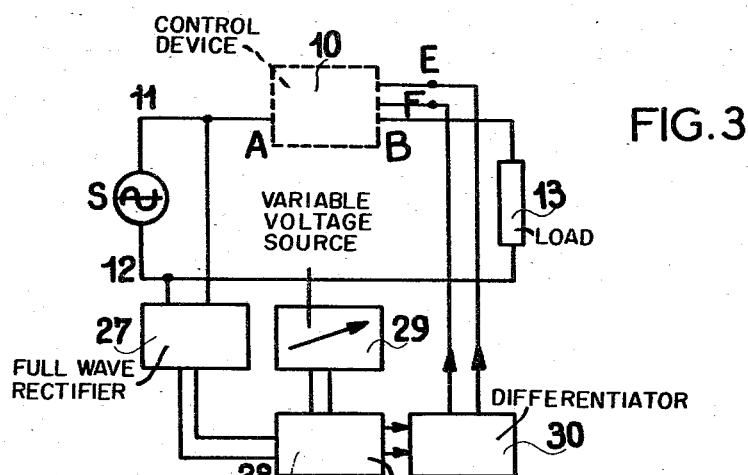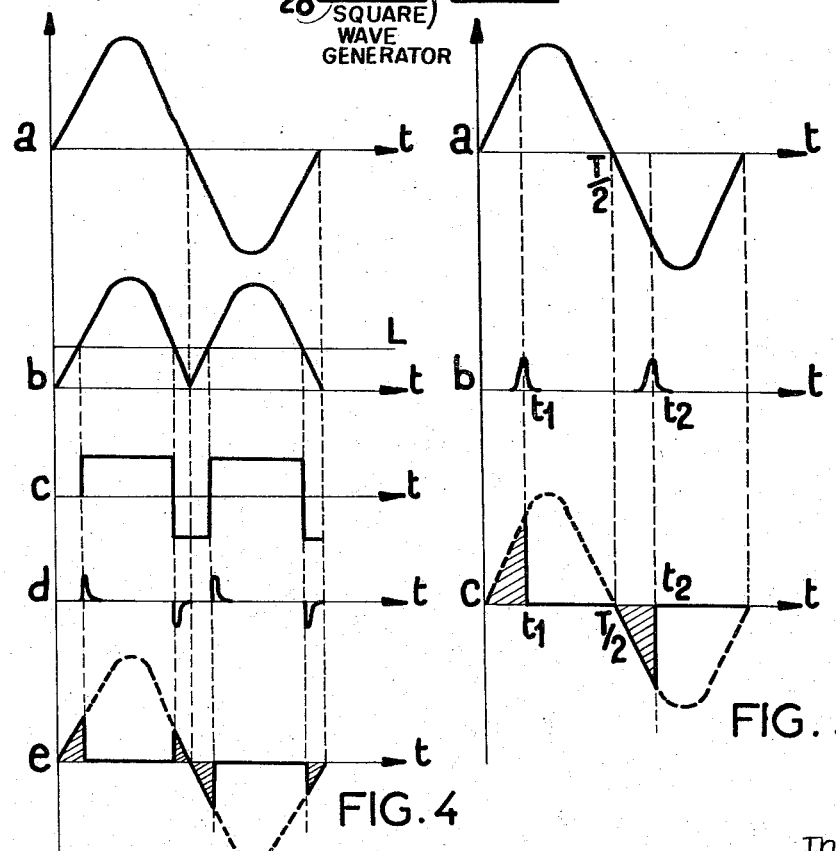

United States Patent Office 3,355,657
Patented Nov. 28, 1967

3,355,657
DEVICE FOR ADJUSTING THE CONSUMPTION OF AND PROTECTING AN APPARATUS SUPPLIED WITH ALTERNATING CURRENT
Jean-Pierre Biet, Saulx-les-Chartreux, and Jean Chaupit, Fontenay-aux-Roses, France, assignors to Compagnie Generale d'Electricite, Paris, France, a corporation of France
Filed July 29, 1964, Ser. No. 385,858
Claims priority, application France, July 30, 1963, 943,125
7 Claims. (Cl. 323—22)

ABSTRACT OF THE DISCLOSURE

A control circuit for adjusting the power supplied to a load and which employs an assembly including a symmetrical semiconductor component having a control electrode and two supply terminals. A transformer has its primary winding connected to a source of control signals and one terminal of the secondary winding connected to the control electrode of the semiconductor component. A pair of series connected diodes have like terminals thereof connected to the two supply terminals of the semiconductor component and the common juncture thereof is connected to the remaining terminal of the secondary winding of the control transformer. A frequency multiplier has its input connected to an alternating current supply source and at least one adjustable phase shifter connected to its output. A pulse generator has its output connected to the output of the adjustable phase shifter and has its output connected across the input terminals of the primary winding of the control transformer. Variations of this basic circuit are possible such as employing a full wave rectifier and adjustable voltage source for a square wave generator to form the adjustable phase shifter of the circuit. If desired, polyphase arrangements can also be provided.

This invention relates to a device which utilizes a symmetrically operating semiconductor component adapted to be gated on and rendered non-conductive and which comprises a control electrode for closing or opening the circuit of an alternating-current source and varying the power supplied by the said source to a load apparatus of any type, by means of voltages applied to the control electrode.

There is disclosed in the U.S. Patent Application Ser. No. 367,470, in the name of Jean-Pierre Biet, "Symmetrically Operating Devices for Rendering a Circuit Non-conductive and Conductive," filed on May 14, 1964, a semi-conductor component of the pnpnp-type comprising two highly doped p-type layers, termed $P_{t1}$ and $P_{t2}$, which enclose two n-type layers of medium doping, termed $N_1$ and $N_2$, which in turn enclose a high resistivity p-type layer, termed the layer $\pi$, the said semiconductor component comprising two ohmic contacts on the layers $P_{t1}$ and $P_{t2}$ respectively, and an electrode C consisting of an ohmic contact connected to the layer $\pi$. The terminals A and B connected to the layers $P_{t1}$ and $P_{t2}$ constitute the supply terminals of the semiconductor component, and the electrode C is the control electrode.

There is also disclosed in the same patent an assembly for the application of the said semiconductor component, comprising a transformer whose primary winding terminals constitute the control terminals E and F, and whose secondary winding has one of its terminals connected to the control electrode C of the semiconductor component and its other terminal connected to the common point between two diodes, of which the other terminals are connected, respectively, to the supply terminals A and B of the semiconductor component. Under these conditions, with any value of the voltage between the supply terminals A and B lower in absolute value than a value called the breakdown voltage, the component is rendered non-conductive when a pulse having the desired polarity and amplitude has been applied to the control terminals E and F, and is gated on when a pulse of opposite polarity has been applied to the said control terminals.

The invention relates to a device which utilizes this assembly for the purpose of adjusting as required, in a continuous and simple and economic manner, the power supplied to a load member by an alternating-current source.

This device is characterized by the fact that it comprises a control circuit including a frequency multiplier member supplied by the said alternating-current source, at least one adjustable phase shifter connected to the output of the said frequency multiplier member and a pulse generator synchronized by the output voltage of the adjustable phase shifter, and of which the output is connected to the aforesaid control terminals, the power supplied by the load apparatus being adjusted by adjustment of the said phase shifter.

If the said device comprises a single assembly formed of a phase shifter and a pulse generator, the latter members produce the gating on of the semiconductor component, which is rendered non-conductive when the voltage supplied by the source passes through zero value.

In accordance with one constructional form of the device according to the invention, the control circuit comprises, in parallel at the output of the frequency multiplier, two independently adjustable phase shifters, each of which is associated with one pulse generator, the outputs of these two generators being connected in parallel to the control terminals of the aforesaid assembly.

In this case, there is obtained at the common output of the two generators, two pulse trains of opposite polarities, the pulses of one polarity producing the gating-on of the semiconductor component, and the pulses of opposite polarity rendering it non-conductive.

In accordance with a further constructional form of the device according to the invention, the said device comprises on the one hand a single assembly formed of a phase shifter and a pulse generator for gating-on the semiconductor component, and on the other hand a transformer one winding of which is connected in series in the supply circuit of the said component, and to which there is applied a momentary gating-on voltage higher than the breakdown voltage of the said component.

Further secondary features of the device according to the invention will become apparent from the following description of a number of embodiments thereof.

FIGURE 3 illustrates a second constructional form of the device according to the invention, in which the control circuit produces a symmetrical phase shift to pulses of opposite polarities.

FIGURE 4 shows curves explaining the operation of the device according to FIGURE 3.

FIGURE 5 shows the voltage curves obtained in a device similar to that of FIGURE 1, but of simplified form.

Figure 6:
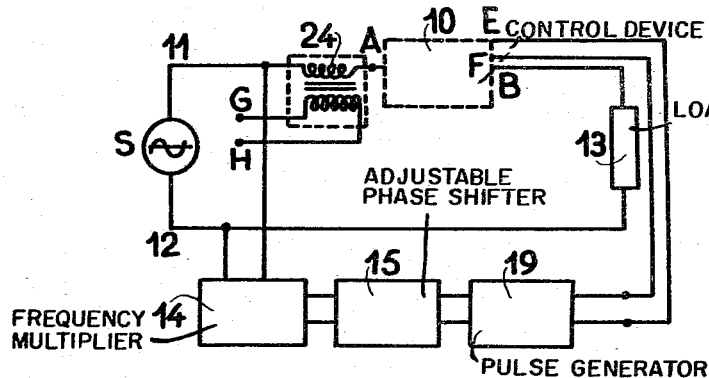
Figure 7:
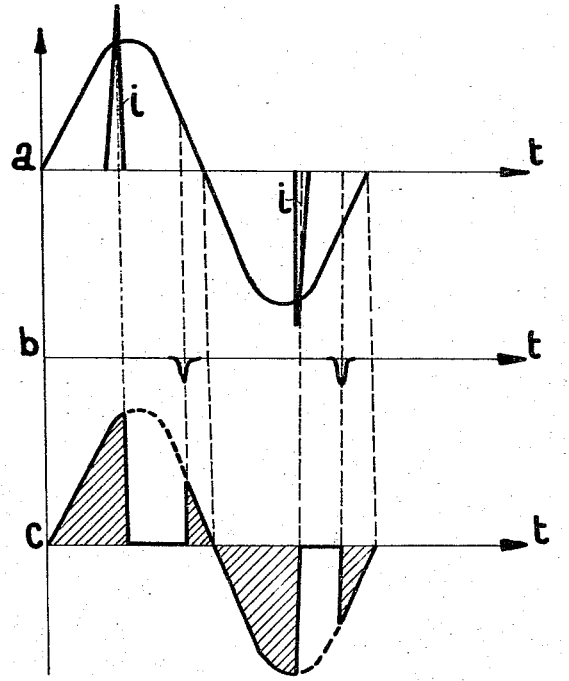
Figure 8:
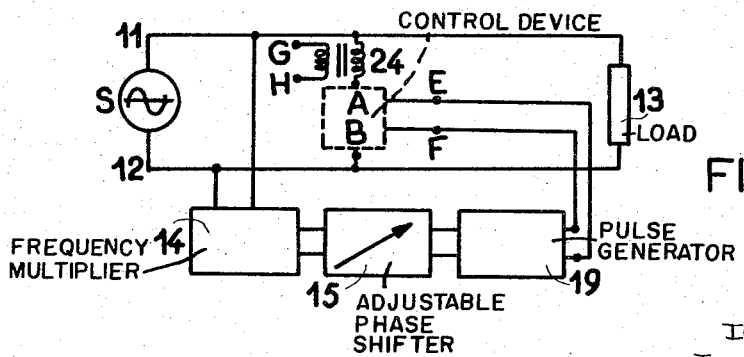

FIGURES 6, 7 and 8 refer to variants in which the gating-on of the semiconductor component is produced by the application of a pulse between its supply terminals, the said semiconductor component being either in series with the load apparatus (FIGURE 6) or in shunt with the said apparatus (FIGURE 8). FIGURE 7 shows the voltage forms obtained in the devices according to FIGURES 6 and 8.

Figure 1:
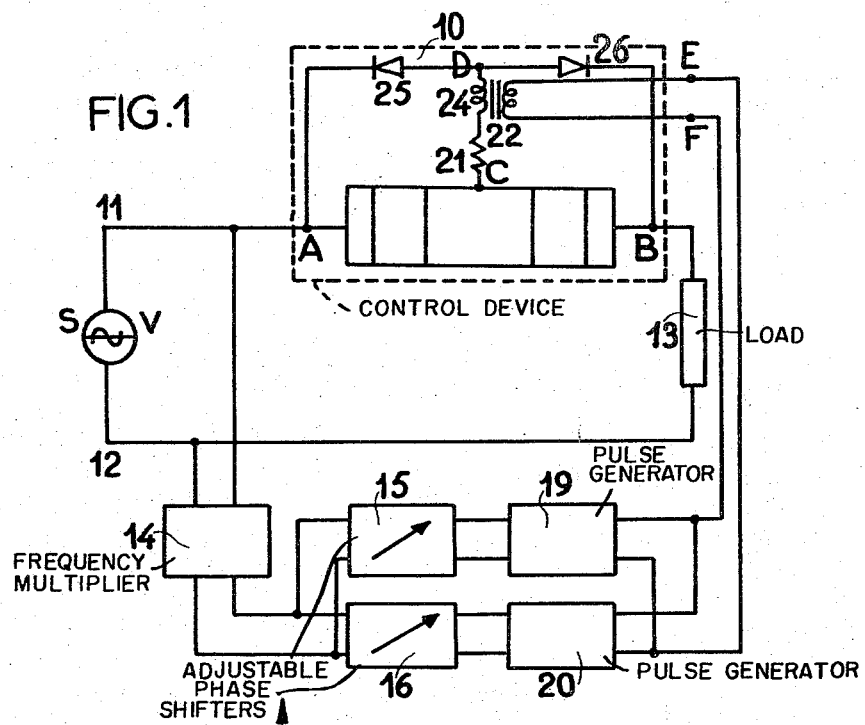
FIGURE 1 illustrates a first form of the device according to the invention, in which the control circuit comprises two independently adjustable phase shifters.
Figure 2:
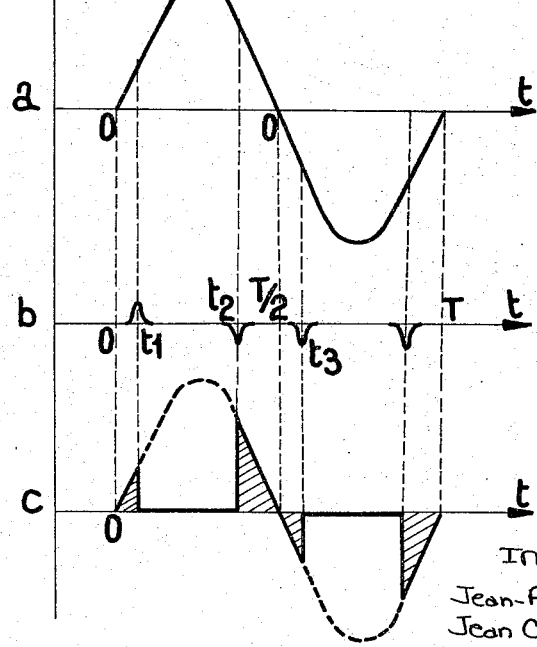
FIGURE 2 shows curves explaining the operation of the device according to FIGURE 1.

In FIGURE 1, 10 denotes the assembly of the semiconductor device and its feed circuit. A and B are the supply terminals of the component, C is its control terminal and 25 and 26 denote two diodes having a common point D and also connected to the terminals A and B respectively. The secondary winding 24 of a transformer 22 is connected in series with a resistance 21, between the control terminal C and the point D. The terminals E and F of the primary winding of the transformer 22 constitute the control terminals of the assembly 10. A main circuit consists of the series arrangement of the source S supplying alternating current at frequency $f$ and having the period T, which source is connected to the input terminals 11 and 12 of the semiconductor component, and of the load apparatus 13.

The control circuit comprises a frequency doubler 14 of known type, of which the input is connected to the terminals of the source S. Connected in parallel to the output of the said frequency doubler are two circuits each comprising an adjustable phase shifter 15 (16) connected in series with a pulse generator 19 (20). The output terminals of the two generators 19, 20 are connected in parallel to the control terminals E, F of the assembly 10. Each of the two "phase shifter-pulse generator" assemblies applies to the control terminals E, F pulses of frequency $2f$, of which the phase is variable in accordance with the adjustment of the phase shifter. For example, the pulses emanating from 19 have positive polarity and produce the gating-on of the semiconductor component, and the pulses emanating from 20 have the opposite polarity, and render the said component non-conductive.

The curve $2a$ represents the variation, as a function of time, of the voltage V of the supply source S. The curve $2b$ represents the succession of positive and negative pulses, of repetition frequency $2f$, which emanate from the generators 19 and 20, and which are applied to the control terminals E, F of the assembly 10.

The curve $2c$ represents the voltage $V_A - V_B$ between the supply terminals A and B of the component. Between the instant O and the instant $t_1$ of the first pulse supplied by 19, the component is non-conductive. Its resistance is therefore substantially infinite and the voltage across the terminals A and B is substantially equal to the voltage V. Between the instant $t_1$ and the instant $t_2$ of the first pulse supplied by 20, the component is gated-on. Its resistance is therefore extremely low, and the voltage across its supply terminals A and B has very low value. At the instant $t_3$ of the second pulse supplied by 19, the component is again rendered non-conductive. Since the first half-cycle of V ends at an instant $T/2$ comprised between the instants $t_2$ and $t_3$, the component is in the non-conductive state at the said instant $T/2$, when the voltage V passes through zero, which constitutes in itself a non-conductive condition. Between the instants $T/2$ and $T$, i.e. during the negative half-cycle of V, the same succession of states is produced as during the positive half-cycle.

If, as is frequently the case, there is no disadvantage in the phase shifting of the blocking and gating-on pulses being symmetrical, the device may be simplified as illustrated in FIGURE 3. The device according to this figure comprises, at the terminals of the source S, a symmetrical rectifier 27 whose output voltage has the form of semi-sinusoids of like polarity. Connected to the output of the said rectifier 27 is a square-wave voltage generator 28, which is on the other hand controlled by an adjustable unidirectional-voltage source 29. Such a generator is of conventional type and may consist, for example, of a Schmitt tigger. It supplies square waves of opposite polarities in symmetrical positions. The said square waves are thereafter applied to a differentiator 30, at the output of which pulses of opposite polarities are collected.

The curve $4a$ represents, in the same way as the curve $2a$, the voltage V of the source S. The curve $4b$ represents the voltage at the output of the rectifier 27. The curve $4c$ represents the voltage at the output of the generator 28, and the curve $4d$ illustrates the pulses obtained at the output of the differentiator 30. Finally, the curve $4e$ shows the variation of the voltage $V_A - V_B$ across the supply terminals of the semiconductor component.

On variation of the adjustment of the voltage source 29, the voltage applied to the square-wave generator 28 is varied, this voltage being represented in the curve $4b$ by the straight line L, and consequently the instants at which pulses of opposite polarities are set up at the output of 30 are also varied, as is well known in such a pulse generator.

Instead of the semiconductor being rendered nonconductive and conductive only once per half-cycle of the voltage V, it may be done, two, three etc., times, per half-cycle. For this purpose, if the device according to FIGURE 1 is employed, the frequency doubler 14 is replaced by a multiplier operating with an even multiplication factor (4, 6, etc.) If the device according to FIGURE 3 is employed, a multiplier operating with a factor 2, 4, etc. is inserted on the input side of the rectifier 27.

In a variant of the device according to the invention, the semiconductor component may be gated on by an action other than the application of a blocking pulse to its control terminals. As is known, and as has been recalled in the foregoing, the zeroization of the voltage across the supply terminals A, B constitutes a blocking condition. Advantage may be taken of this property by applying a single pulse train to the control terminals in order to render the component conductive, the passage of the supply voltage through zero twice in each cycle bringing about the non-conductive condition. A device operating in this way is identical to that according to FIGURE 1, but it comprises only a single "phase shifter-pulse generator" assembly, for example the assembly 15–19.

It has not been considered necessary to illustrate such a device, but FIGURE 5 illustrates its operation.

The curve $5a$ represents, as before, the variation of the voltage V as a function of time $t$; the curve $5b$ shows the succession, at the instants $t_1$, $t_2$, etc., of the pulses of like polarity obtained at the output of the generator 19, and the curve $5c$ shows the voltage across the terminals A, B of the semiconductor component. It will be seen from this latter curve that the said component is non-conductive between the instants O and $t_1$, whereafter it is gated-on between the instant $t_1$ and the instant $T/2$. At this latter instant, the passage of the voltage V through zero again brings about the non-conductive state, which lasts until $t_2$, and the same cycle continues.

In accordance with another variant of the device of the invention, which is the inverse to the preceding variant, the semiconductor component may be rendered non-conductive by a pulse applied to its control terminals, and it may be gated-on by a pulse, of voltage higher than the breakdown voltage, applied to its supply terminals. FIGURE 6 illustrates such a variant.

The device according to the said figure comprises only one assembly formed of a phase shifter 15 and a pulse generator 19. The secondary winding of the transformer 24 is inserted between the source S and the supply terminal A of the semiconductor component. There is applied to the terminals G, H of the primary winding of the said transformer a gating-on pulse whose voltage is higher, in absolute value, than the breakdown value of the component, and is of the same polarity as the voltage applied to the supply terminal A of the latter.

FIGURE 7 illustrates the voltages at various points of the device according to FIGURE 6, in the particular case where the gating-on pulse is applied between the terminals G, H at the instant when the voltage V is at maximum amplitude in each direction. However, in the general case, the gating-on pulse could, of course, be applied at any instant during the half-cycle of the voltage V, except at the instant when the said voltage passes through zero. The curve 7a shows the voltage V supplied by the source S, upon which the gating-on pulses i are superimposed. The curve 7b shows the blocking pulses applied by the terminals E, F, and the curve 7c shows the voltage obtained across the supply terminals A, B of the semiconductor component.

A variant according to FIGURE 8 is employed more particularly for the protection of the load apparatus, rather than for effecting an adjustment of the power which is supplied thereto.

In this variant, the load apparatus 13 is directly connected to the terminals of the source S, and the semiconductor component, in series with the secondary winding of the transformer 24, is connected in parallel with the said source. Under these conditions, if an accidental voltage of short duration occurs across the terminals G, H of the primary winding of the said transformer, the semiconductor component will be gated-on, and its presence at the terminals of the load apparatus 13 will protect the latter. When the control circuit thereafter receives a blocking pulse, normal operation will be resumed. If the voltage applied to the terminals G, H does not substantially exceed its rated value, the blocking and gating-on pulses have no practical effect upon the load apparatus.

In FIGURES 6 and 8, the terminals G and H of the primary winding of the transformer may in particular be connected to the terminals 11 and 12 of the source S.

The various constructional forms of the device according to the invention, as just described, could readily be adapted to the case where the source S is of polyphase form. A device according to FIGURES 1 and 6 would be connected in series in each phase wire, and a device according to FIGURE 8 would be connected between each pair of phase wires.

We claim:

1. A control circuit for adjusting the power supplied to a load apparatus by an alternating-current source by means of an assembly having a set of control terminals and comprising a symmetrical semiconductor component having a control electrode and two supply terminals connected in circuit relationship with said source and said load apparatus and adapted to be gated on and off by application of a voltage to the control electrode, a transformer including a primary winding whose terminals comprise the control terminals of the assembly and a secondary winding having one terminal connected to the control electrode of the said semiconductor component, said assembly further comprising a pair of series connected diodes having like terminals thereof connected respectively to the two supply terminals of the said semiconductor component and the common juncture thereof connected to the remaining terminal of the secondary winding, the said control circuit being characterized by the fact that it further comprises a frequency multiplier having its input connected to the alternating-current source, at least one adjustable phase shifter connected to the output of the said frequency multiplier and at least one pulse generator synchronized by the output voltage of the adjustable phase shifter and having its output connected to said control terminals of the aforesaid assembly.

2. A control circuit according to claim 1, characterized by the fact that the frequency multiplier comprises a full wave rectifier which rectifies the two half-cycles of the alternating current source, the pulse generator comprises a square-wave voltage generator and differentiating circuit, and the adjustable phase shifter comprises an adjustable unidirectional-voltage source for supplying an adjustable excitation voltage to the square-wave voltage generator.

3. A control circuit according to claim 1, characterized by the fact that it comprises a single adjustable phase shifter-pulse generator arrangement for setting up only blocking pulses and means for applying gating-on pulses to the supply terminals of the semiconductor component.

4. A control circuit according to claim 3, characterized by the fact that the means for applying gating-on pulses consists of a transformer whose secondary winding is connected in series between the alternating-current source and one supply terminal of the semiconductor component, and of which the primary winding is connected to a pulse generator.

5. A control circuit according to claim 4, characterized by the fact that the load apparatus is connected directly to the terminals of the alternating-current source, and the semiconductor component is connected in series with the secondary winding of a transformer having its primary winding connected to the output of a pulse generator and the series circuit thus comprised is connected in shunt to the terminals of the load apparatus.

6. A control circuit according to claim 1, characterized by the fact that, the source supplies a polyphase alternating current and the control circuit of claim 1 is inserted in each phase wire.

7. A control circuit according to claim 5, characterized by a source which supplies a polyphase alternating current and the control circuit of claim 5 is disposed between each pair of phase wires in parallel with the loads.

References Cited

UNITED STATES PATENTS

| | | | |
|---|---|---|---|
| 3,070,739 | 12/1962 | Hansen et al. | 323—22 X |
| 3,176,212 | 3/1965 | De Puy | 321—18 X |
| 3,188,487 | 6/1965 | Hutson | 307—88.5 |
| 3,204,113 | 8/1965 | Snygg | 307—88.5 |
| 3,263,157 | 7/1966 | Klein | 323—22 |

JOHN F. COUCH, *Primary Examiner.*

W. M. SHOOP, *Assistant Examiner.*